United States Patent [19]

Hawkins

[11] Patent Number: 4,968,024

[45] Date of Patent: Nov. 6, 1990

[54] GROUND SURFACE MATERIAL

[75] Inventor: Paul Hawkins, Leicester, England

[73] Assignee: En-Tout-Cas plc, Leicester, England

[21] Appl. No.: 462,711

[22] Filed: Jan. 9, 1990

[30] Foreign Application Priority Data

Sep. 21, 1989 [GB] United Kingdom ............... 8921367

[51] Int. Cl.$^5$ ........................... A63J 3/00; C09K 3/18
[52] U.S. Cl. ............................................ 272/3; 272/5;
106/83; 106/277; 252/88; 252/311.5; 428/404;
428/407; 524/62
[58] Field of Search ........................................ 272/3–5;
106/277, 229, 83, 84, 901; 252/18, 311.5;
524/62, 59, 270, 274; 428/403–407, 443

[56] References Cited

U.S. PATENT DOCUMENTS

| | | | |
|---|---|---|---|
| 1,600,515 | 9/1926 | Secoy | 252/88 |
| 2,855,319 | 10/1958 | McConnaughay | 106/277 |
| 2,941,893 | 6/1960 | McConnaughay | 106/277 |
| 3,607,773 | 9/1971 | Pitchford et al. | 252/311.5 |
| 4,433,084 | 2/1984 | Ostermeyer et al. | 524/62 |
| 4,452,926 | 6/1984 | Matsushima et al. | 428/407 |
| 4,792,133 | 10/1988 | Hawkins et al. | 272/3 |
| 4,852,870 | 8/1989 | Hawkins et al. | 272/3 |

*Primary Examiner*—Richard E. Chilcot, Jr.
*Attorney, Agent, or Firm*—Spensley Horn Jubas & Lubitz

[57] ABSTRACT

A ground surface material comprising a particulate base material such as sand which is coated with a binder comprising a free flowing extender oil, typically an aromatic oil, having a synthetic polymeric material such as styrene-butadiene-styrene copolymer dissolved or dispersed therein. The material can be laid on a suitable porous base to form a sports surface for a horse running track or the like.

8 Claims, No Drawings

GROUND SURFACE MATERIAL

The present invention relates to a ground surface material and particularly, though not exclusively, to a material for use as a sports surface such as a horse racing track.

U.S. Pat. No. 4,792,133 and U.S. Pat. No. 4,852,870 disclose substitute ground surface materials comprising sand and other particulate material which is coated with a binder formed from an oil having the consistency of a soft grease at normal temperatures and having a polymer dissolved or dispersed therein. The oil is typically a petroleum oil fraction having a viscosity of about 1000 centipoise at 20° C. and typical polymers are ethyl vinyl acetate, polystyrene, nylon, polypropylene, poly vinyl cholride and styrene-butadiene-styrene copolymers included in amounts of about 1 part polymer to 9 parts oil. The material typically comprises dry sand and binder in a ratio of 100:6.5.

These materials suffer from the problem that their physical properties are mainly dictated by the properties of the oil in the binder and soft greases typically change to free flowing oils at about 85° F. This means that when high climatic temperatures are encountered, the properties of the material can change dramatically.

It is an object of the present invention to provide a ground surface material which can retain its desired properties at high and low climatic temperatures.

In accordance with the present invention, there is provided a ground surface material comprising sand or a similar particulate material coated with a binder comprising a free flowing extender oil having a polymer dissolved or dispersed therein.

Preferably, the extender oil has a viscosity transition below $-5°$ F. and has approximately uniform viscosity above this. Typical oils are free flowing aromatic oils.

The polymer is preferably a block co-polymer such as styrene-butadiene-styrene (S.B.S), or a polymer or copolymer having similar properties. The polymer must remain sufficiently resilient throughout the normal temperature range to retain the desired properties of the material. Consequently, an appropriate polymer would not suffer from excessive crystallinity at low temperatures which would reduce its resilience and would be resistant to degradation at higher temperatures.

A typical binder composition comprises 20-40% polymer, preferably about 40%, the remainder being extender oil.

The present invention will now be described by way of a non-limiting example.

A batch of sand of varying particle size in as-dug condition is dried and treated with a binder comprising 40% SBS (Europrene Sol T168-Enichem Ltd) and 60% extender oil (Prospect 380-Carless Refining). The sand and binder mixture comprises 98% dried sand and 2% binder.

The binder is formed by heating the extender oil to approximately 120° C. in a thermally insulated holding tank whilst being continuously agitated. The polymer, in the form of pellets, is slowly added to the agitated oil to effect rapid and thorough dissolution. When all of the polymer has been dissolved and the viscosity of the binder solution is uniform throughout, the binder is available for use.

The dry sand is heated to approximately 120° C. and the binder is added and thoroughly mixed.

The resulting mixture can be laid to a depth of 15-20 cm as a superstrate over a suitable porous base to give a surface which provides a running surface for horses having a sufficient amount of "give" to prevent excessive jarring yet still providing a degree of reaction to assist in the next stride. The surface can be maintained by raking and light rolling to restore the properties of the surface if it is excessively distorted in use and to remove any water held in the surface.

Other suitable extender oils are: Telura 126 or 171 (Exxon) and Cariflux 510 or LP (Shell).

I claim:

1. A ground surface material comprising a particulate base material selected from the group consisting of sand or like materials, said particulate material being coated with a binder which comprises a free flowing extender oil having a synthetic polymeric material dissolved or disposed therein.

2. A ground surface material as claimed in claim 1, wherein the synthetic polymeric material is a styrene-butadiene-styrene copolymer.

3. A ground surface material as claimed in claim 1, wherein the free flowing extender oil is an organic oil having aromatic functional groups.

4. A ground surface material as claimed in claim 1, wherein the free flowing extender oil has a viscosity transition below $-5°$ F. and approximately uniform viscosity above this temperature.

5. A ground surface material as claimed in claim 1, wherein the binder comprises 20-40% synthetic polymeric material, the remainder being free flowing extender oil.

6. A ground surface material as claimed in claim 5, wherein the binder comprises about 40% synthetic polymeric material.

7. A ground surface material as claimed in claim 1, comprising 98% dried sand and 2% binder.

8. A surface for sports activities comprising a porous base material laid on the ground and a ground surface material comprising a particulate base material selected from the group consisting of sand on like material, said particulate material being coated with a binder which comprises a free flowing extender oil having a synthetic polymeric material dissolved or dispersed therein laid to a depth of 15-20 cm on said porous base material to provide a surface thereon.

* * * * *